Figure 1:
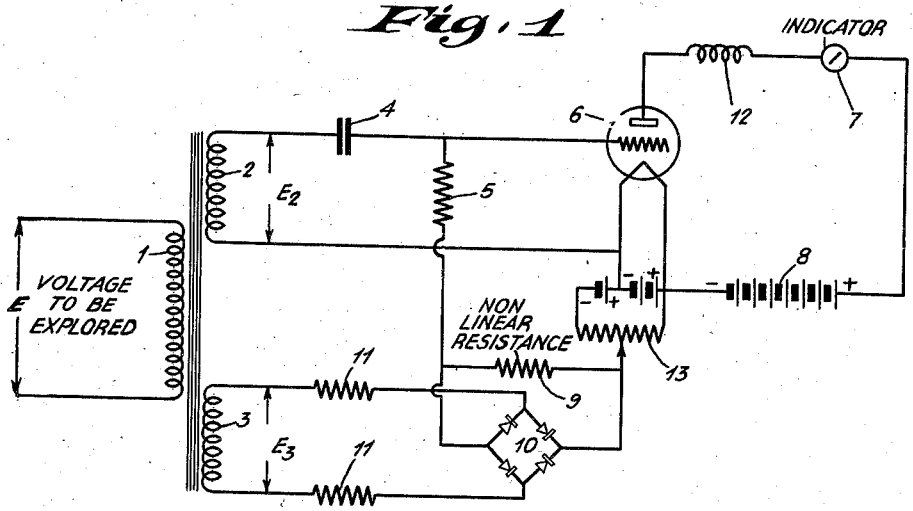

May 31, 1938.  J. BÄBLER  2,119,194
MODULATION METER
Filed May 26, 1934  2 Sheets-Sheet 1

INVENTOR
JUSTUS BÄBLER
BY
ATTORNEY

Patented May 31, 1938

2,119,194

UNITED STATES PATENT OFFICE 2,119,194

MODULATION METER

Justus Bäbler, Berlin, Germany, assignor to Telefunken Gesellschaft für Drahtlose Telegraphie m. b. H., Berlin, Germany, a corporation of Germany Application May 26, 1934, Serial No. 727,658
In Germany May 30, 1933

18 Claims. (Cl. 179—171)

Because of the requirements that are made regarding modern electric transmission equipment it is imperative to provide modulation meters on the ground that over-modulation in particular is causative of the most troublesome and disagreeable distortions. According to the prior art the following devices have been used to act as modulation meters: (1) indicators of mean or effective values (root mean square); (2) impulse meters predicated for their operation upon audion action, and (3) glow-lamp crest meters.

The mean or effective (root mean square) indicator instruments afford a direct measure and criterion for the prevailing volume. However, because of the inherent inertia of the needle it is unable to exhibit any response to crests so that transient overmodulations or very peaked voltage curves will not be indicated at all. If the time-constant of the pointer is made correspondingly smaller, the consumption of current soon becomes inadmissibly high and the pointer becomes very tenuous and therefore poorly visible. Another factor is that the ease of reading is greatly impaired owing to the rapidity of changes in deflection, the needle erratically oscillates to and fro so that the eye very soon is not even able to perceive the reversing points of the needle. In other words, this kind of instrument is but poorly suited for indicating overmodulation.

The impulse type of meter which is based upon an audion action responds to the peaks. The time of adjustment is a function of the time-constant of the grid charge and discharge elements. The time-constant in this case is permitted to be substantially greater with the consequence that the needle is able to follow the changes without haste and that steady and safe readings are feasible. But there is this demerit, namely, that the pointer responds to and indicates only the highest crests, while it fails to afford any correct clues regarding the volume.

The glow-lamp crest or peak indicator indicates the peaks in the absence of all inertia. But the consumption of energy is, relatively speaking, very high, not to mention this further fact that the luminous radiation of the glow-lamp in a great many instances is very feeble, especially under conditions insuring insufficient screening of the daylight.

One shortcoming common to all of these modulation meters is that for small potentials they possess extremely low responsiveness or sensitivity, in fact, in the case of subdued passages the needle drops to almost zero. Glow-lamps, for instance, whenever such passages are concerned entirely fail to respond.

In a modulation meter or wave amplitude meter of the kind here disclosed all of the said drawbacks have been obviated, while yet the merits inherent in meters of the earlier art are preserved.

The modulation meter of this invention consists of a measuring device in which alternating voltages are measured by means of two different methods and are suitably combined so as to be read thus in a joint instrument.

I have attempted to point out the novel features of my invention in the claims appended hereto as required by law.

Figure 4:
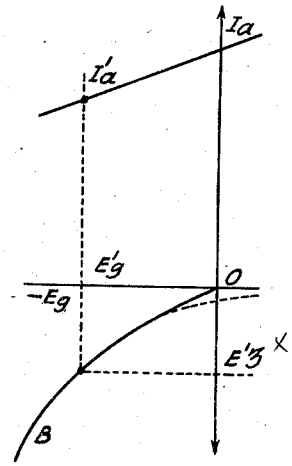
Figure 5:
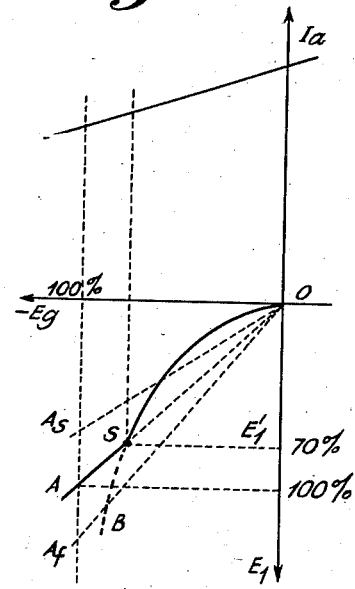
Figure 6:
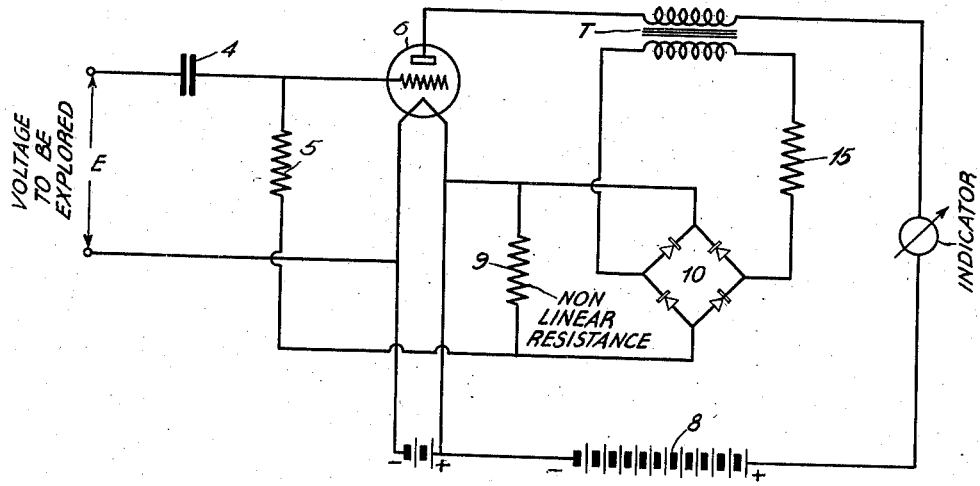

The nature of my invention and the manner in which the same is carried out will be understood from the following detailed description thereof and therefrom when read in connection with the attached drawings in which Figures 1 and 6 show circuit arrangements of meters arranged in accordance with my invention; while, Figures 2, 3, 4, and 5 are curves illustrating the operation of my invention.

The circuit arrangement shown in Figure 1 represents a combination of a linear peak indicator and an indicator of the average of the logarithm of the mean values of wave energy. Starting at a definite percentage of modulation near the maximum measuring range of the meter the measuring characteristic passes from one type of operation to the other. As long as low potentials are involved, the arrangement acts as a logarithmic mean value average indicator, and for high voltages, in the vicinity of the point at which the limiting modulation takes place or over-modulation is accomplished, the meter acts like a linear crest indicator.

Figure 2:
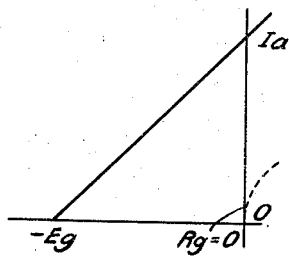

The circuit scheme is as follows: The voice voltage is transferred from winding 1 to the windings 2 and 3. Connected with the winding 2 is the peak measuring circuit arrangement known in the prior art and comprising the condenser 4, the leak 5, the tube 6, the choke coil 12, instrument 7 and battery 8. Assuming that the leak 5 is connected with the cathode of tube 6, the mean value of the current flowing through the instrument 7 changes linearly with the maximum or crest value of the alternating voltage. For the present consideration as well as for the discussions further below a sort of idealized tube shall be used as a basis. In the first place, the characteristic connecting the plate current Ia with the grid voltage Eg (mutual characteristic) shall be rectilinear as shown by Fig. 2. Secondly, the grid current in the presence of zero grid voltage shall suddenly rise from zero to a certain value as indicated by the dotted line of Fig. 2, and the resistance of the grid Rg at this point shall be zero. Moreover, the apparent resistance of the choke-coil 12 shall be high contrasted with the internal tube resistance so that the dynamic characteristic turns out to be flat in form.

Now assume that the resistance 5 is not connected directly to the cathode of 6 but is connected as shown in Figure 1 to a non-linear resistance 9 connected with the output of a rectifier 10 supplied by voltage from 3 through high resistances 11. 9 is of such a nature that the voltage drop across it is proportional to the logarithm of the current through it. (The resistance of 9 decreases as the current through it increases.) By means of high resistances 11 the rectified current is proportional to E3. Therefore the voltage across 9 is proportional to the logarithm of C E3 where C is a constant. Consequently, the grid of 6 is biased by the potential drop in 9 a value which varies with E3 when mean amplitude values are to be read. For the values of E1 where mean readings are taken as described immediately above, E2 is insufficient to overcome the bias produced by 9. However, as stated, the potential drop in 9 grows at a rate less than linearly with increase of E1, E2 and E3 and obviously at some point E2 must overtake the potential drop produced by 9 and the condenser 4 and grid of 6 is changed by E2 to read the peak values of E2 and we now get peak readings in the indicator. This point, at which E2 overcomes the potential drop in 9, is the point of transition. Above this value or point, peak readings controlled by E2 are produced, below this point mean readings controlled by E3 are produced.

Figure 3:
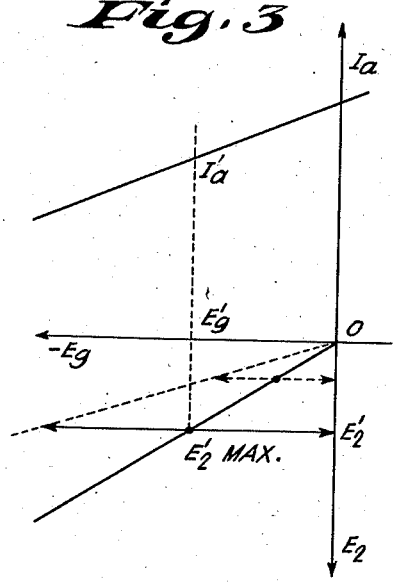

As a result of the alternating potential E2 rectified grid current will flow across the resistance 5 when the amplitude of E2 is greater than the bias on the grid of 6, 5 being a high resistance, this results in a potential drop in the grid circuit corresponding to the amplitude of the alternating potential E2, while the mean grid voltage is shifted by this potential drop a similar amount into the negative region. The dependence of the mean plate current Ia upon the mean grid voltage Eg, and of the latter, in turn, upon the mean value of the alternating voltage E2 is illustrated in Figure 3. For any desired value of the plate current, say I'a, the manner in which the grid direct current voltage E'g corresponding thereto has been produced is entirely immaterial. In other words, it will be immaterial whether the potential changes on the grid of the tube at the frequency of the alternating current E2 to be explored are relative to a zero point indicating the mean or center value of the oscillations E2 and due to grid rectification, or whether they originate with respect to a direct current source of potential arising, say, in 13, between the cathode and the leak potential value produced across resistance 9. It is important in this connection that only one of the voltages is alternating e. g. that produced by E2; the other voltage must be a direct current voltage, or at most it might contain relatively slow pulsations. Now, this other voltage acting across the resistance 9 as a consequence of the special kind of resistance, inside a certain range, is proportional to the logarithm of the mean value of the alternating potential E3 arising across the winding 3. The voltage crests arising across the resistance 9 are faithful, though shortened in a logarithmic measure. These crests must be flattened by way of a resistance condenser arrangement in order to be enabled to act upon the grid in the form of pulsating direct current voltages. This flattening is produced by the resistance 5 and the condenser 4 regardless of their other function in the peak-measuring arrangement. The rate of velocity with which the biasing voltage follows the continuously fluctuating tonal voltage is a function of the time constants of 4 and 5. The time constant in this connection is so chosen that the lowest frequency of the band (30 cycles) produces no appreciable pulsation at the grid. In Figure 4 the curve OB represents the grid direct current voltage as a function of the alternating voltage E3.

The ammeter 7 interposed in the plate circuit of tube 6 shows a current which is a function of the average of the grid to filament voltage taken during brief periods of time. The grid to filament voltage depends upon two sources of potential. Below selected peak values of E2 there is no potential drop produced in the grid circuit by grid rectification due to E2, and E3, acting through 10 and 9, produces a potential which controls the tube and the mean value readings produced in 7. Above the selected value of E2 (peaks) rectification occurs and there is a potential drop in 5 and 9 which is, it is true, supplemented by a potential produced in 9 and 10 but yet the voltage E2 controls the readings in 7 as has been shown hereinbefore. Actually the voltages produced by 10 and 9 excited by E3 serve as a starting point or point of origin for the potentials produced in 5 by voltages E2 above the selected value which are to produce peak readings.

One of the sources of voltage is directly governed by the voltage E2. However, whether this alternating voltage E2 determines the working point of the tube depends upon the biasing potential to be impressed upon the grid in some other manner (such bias being, on the one hand, produced by the device 13, and, on the other hand, by the voltage across resistance 9 which is determined by E3). A grid current is able to arise only when the alternating voltage E2 is so high that temporarily or transiently (that is, in the presence of the high peaks or crests of the positive alternation) electrons from the filament attain the grid, with the result that the latter is charged. Because of the presence of resistance 5, such charging is unable to become equalized immediately in reference to the cathode. Across the terminals of resistance 5 is set up a fall of potential. This fall of potential therefore is a result of the alternating voltage E2. This fall of potential means a shift in the working point of the tube. In the case where the alternating voltage E2 is high enough in order to create a biasing voltage, the working point of the tube is governed by voltage E2. Hence, in the presence of large values of E2, the plate current of the tube 6, i. e., the deflections of the instrument 7, from a given value corresponding to E3, is a function only of the working point of tube 6 due to E2.

The other voltage source is due to (conditioned by) E3. The alternating current in the transformer coil 3, by virtue of the rectifier 10, results in a direct current in resistance 9. Inasmuch as this resistance is non-linear in nature, there exists no direct proportionality between the ensuing voltage as a function of E3. Hence, resistance 9 acts like a voltage source included in the grid-cathode circuit and being a function of E3 in accordance with a logarithmic law. If the fall of voltage occasioned by this source of potential between the grid and the filament is so high that the alternating voltage E2 is no longer able to cause charging of the grid, it may be said that the gain or amplification factor of the tube, and thus the deflection of the instrument 7, is subject to a control action by the fall of potential caused across resistance 9. Inasmuch as this voltage, in a certain way, is a function of the mean values of the voltages across the transformer 3, there occurs thus a measurement of the mean values of the voice amplitudes.

Double control of the grid-filament voltage has the purpose to make the means of low acoustic currents, figured over large periods of time, more clearly visible upon a linear scale, and to also make readable high voltage crests or peaks, averaged inside small time intervals and which are causative of over-modulation. Hence, this device is perfectly adapted to its object. For, on the one hand, the measuring instrument during low-acoustic passages must result in a clearly visible deflection, while, on the other hand, even transient over-modulations must be visible in order that troublesome over-modulations may be immediately removed.

It will thus be seen that two different voltages are impressed upon the grid of the tube, viz. (1) the faithful alternating voltage E2, and (2) the direct current voltage across 9 which is proportional to the logarithm of the mean voltage E3. The dependence of each thereof upon the input potential E1 is again illustrated graphically in Figure 5. In Figure 5 the graphs of Figures 3 and 4 have been superposed over a common origin and base line. Curve OB shows the shift of the grid biasing voltage in direct proportion to the logarithm of the mean values, while the straight line OA shows the displacement of the grid biasing voltage in proportion to the crest values. In the case of sinuous voltages the two graphs intersect in point S corresponding to grid voltage E'1. For voltages less than E'1, the mean value shift is greater than the shift of the crest value. Hence, the latter remains ineffective to control the plate current because no grid current is able to flow through the resistance 5 and to incidentally produce a fall of potential across the latter to control the grid potential. The negative swings of the alternating current cancel the positive swings so that they have no effect on the plate current. In other words, the indication is here purely that of mean values. For voltages higher than E'1 the voltage peaks are greater than the shift of the mean value. The crest amplitudes attain a point where grid current starts to flow, and the incidentally produced fall of voltage across the resistance 5 additionally shifts the grid biasing voltage into the negative region (S to A of Fig. 5). The shift in potential caused by the mean value of the wave to be explored (S to O of Fig. 5) is now overcome by higher values of E2, and the arrangement has the action of a crest indicator pure and simple.

The resultant calibration curve consists of the portion OS of the graph OSB, and the portion SA of the straight line OSA, in other words, it is composed of portions of calibration curves from two entirely dissimilar measuring methods. The position of the point S follows from the practical requirements of the modulation meter. It is advisable to fix the transition point S at around 70% of the maximum modulation percentage (sinuous voltage wave presupposed). This point corresponds to grid voltage E'1 and at this point the operating characteristic of the double purpose meter changes. In that case the arrangement can be depended upon to operate, in the presence of 100% modulation, safely as a peak-type instrument, while it works as a mean value indicator below the 70% mark. So far as the operator observing the instrument is concerned, the transition point does not become visible or conspicuous; all that may be noticed is the fact that the mobility of the needle below the 70% mark is subject to marked damping, while above the said limit the sensitiveness and the rapidity of the movements are greatly increased.

If voltage curves are concerned which are of a form other than sinuous in that, contrasted with the sinuous wave, they present a peaked or a flat form, the curve OB in Figures 4 and 5 readings will not be altered. But the straight line AO turns at point O. Referring to Figure 5, OAs is a curve indicating crest voltages for peaked curves, while OAf corresponds to flat curves. But in all of these three instances, the value of 100% is attained inside the peak measuring range. It can be seen therefrom that for the indication of peaks the voltage curve no longer plays a part as long as the maximum modulation lies outside the curve OSB. It will be noted in addition that peaked curves, even where low mean values are concerned, shift from the logarithmic range into the range of peaked voltages, and vice versa.

The now-linear resistance 9 referred to above consists of a plurality of series-connected cuprous oxide cells. The fall of potential across the cells, within a certain range, is a function of the current flowing therethrough in accordance with a logarithmic law. It is suitable in this connection to make the active cross-section of the cells as low as possible in order that the consumption of current may be small. In order that this current-dependent resistance 9 may not occasion any non-linear distortions in the input circuit, the resistances 11 must be connected in series therewith, and these most conveniently should be chosen higher than the maximum value of resistance 9. In this manner conditions can at the same time be made so that the voltage arising across 9 will bear a logarithmic relationship not only to the current, but also to the potential E3.

Of particular importance is the time of adjustment of the modulation meter. It is generally known that extremely brief and transient overmodulations, say ranging between 50 and 100 milliseconds at most, will not be perceived by the human ear; in fact, it is only when the overmodulation periods are longer that they will be perceived as such. Whence the inference that the modulation meter should have a response time ranging between 50 and 100 milliseconds. And this condition will be readily insured if the electrical time-constants amount to say 50 milliseconds, and if the instrument has a time of adjustment or response ranging around 50 milliseconds.

It is essential that the instrument 7 be sensitive to all changes in applied current or potential. Any meter of the required sensitivity may be used here. In practice the indicator instrument may consist of a mirror and moving-coil type device, the pencil of light being projected upon a ground glass pane. Compared with a standard needle instrument this offers the advantage that the visual persistence of the eye in response to a brief impression of light makes it possible to readily perceive the reversal point of the deflection. Hence, in this instance, the inherent inertia of the human eye because of which a very rapidly moving needle can no longer be observed, or only very poorly so, is utilized for the purpose of observing rapid needle deflections. To mark individual modulation values, e. g., at 100% a small cylinder lens may be laid upon the ground glass with the result that at that point a particularly conspicuous and intense flash or illumination is produced on the ground glass, at the instant when the pencil of light slips over such a lens. By the use of glass of different colors, or by placing colored and transparent platelets underneath, various cylinder lenses can be distinguished and made identifiable.

In connection with the description of the crest measuring arrangement the assumption was made that the characteristic of the tube is rectilinear and that the grid current starts suddenly at $Eg=0$. In reality, however, the grid current neither starts at O nor does it start abruptly, for as a matter of fact it follows an exponential law, and also this curve can be shifted in a parallel direction according to the cathode material that is used, according to the cathode temperature, etc. A potentiometer 13 makes it possible to so set the biasing voltage that the working point will come to fall exactly at the point of incipient grid current. The finite value of the grid resistance moreover makes conditions so that the straight line OA, Figures 3 and 5 will no longer be independent of the biasing potential acting across the resistance 9, but will be shifted somewhat towards the right-hand side. But this effect is slight; indeed, where the modulation is 100% it causes errors ranging between 10 and 20%, and errors of this amount are immaterial in the case of a measuring arrangement as here disclosed.

In the circuit arrangement hereinbefore described the energy for the rectifier circuit operating in conformity with a logarithmic law is directly derived from a source of potential through a transformer. Now, in many instances, this circuit represents a considerable, if not even an unduly large, load, for the said source. However, any difficulties in that direction may be obviated most suitably by that an input stage is provided ahead or below the rectifier. But such an additional stage may be avoided by causing the measuring tube itself to act as an amplifier without its original function being incidentally disturbed. For this purpose, as shown in Figure 6, the plate choke-coil is constructed to act as the primary of a transformer T, the alternating voltage arising across the said transformer primary being transferred by a secondary winding to the rectifier 10. The plate alternating voltage which so far has remained unutilized is now used for feeding the rectifier circuit by way of a resistance 15. Hence, the source of current will be called upon to supply and cover only the inherently small energy consumed in the audion arrangement, so that the measuring scheme here disclosed works then practically in the absence of energy dissipation.

Having thus described my invention and the operation thereof, what I claim is:

1. In a device for analyzing the nature of modulations on a wave, a transformer having a primary winding energized by said wave and a pair of secondary windings, a discharge tube having its input electrodes connected with one of said windings and its output electrodes connected with a modulation meter, a non-linear resistance connected between the input electrodes of said tube, a bridge circuit having a rectifier in each arm, a connection between one diagonal of said bridge circuit and the other of said secondary windings, and a connection between another diagonal of said bridge circuit and said resistance between the input electrodes of said tube whereby rectified current flows in said non-linear resistance to produce a potential which varies non-linearly as the mean amplitude of said wave varies.

2. A device as recited in claim 1 in which, said non-linear resistance is of the type in which the drop of potential therethrough varies as the logarithm of the current through said resistance.

3. A device as recited in claim 1 in which, resistances are connected between the first mentioned diagonal of said bridge circuit and the secondary winding of said transformer.

4. In a wave amplitude indicating device, a discharge tube having input and output electrodes, a combined peak reading and mean reading indicator connected with the output electrodes of said tube, alternating current circuits connected with said input electrodes to apply thereto a wave to be metered, and linear and non-linear direct current potential producing means connected with said input electrodes to produce a bias therefor which controls said tube to produce indications representative of the mean values of said wave in said meter up to a predetermined wave amplitude and thereafter to produce in said meter indications of the peak value of said wave for amplitudes above said predetermined value.

5. An indicating device as recited in claim 4 in which said means connected with said input electrodes comprises an impedance connected to the input electrodes of said tube and a rectifier of the dry cell type having its input electrodes energized by the wave to be metered and its output electrodes connected to the input electrodes of said tube.

6. An indicating device as recited in claim 4 in which said means connected with the input electrodes of said tube comprises a resistance connected between the input electrodes of said tube, a second resistance connected between the input electrodes of said tube, and a rectifier having its output electrodes connected with said second resistance and its input electrodes energized by the wave to be metered.

7. In a wave form indicating device, a discharge tube having input and output electrodes, an indicator connected with said output electrodes, a transformer having a primary winding which may be energized by the wave to be metered, said transformer also having a pair of secondary windings, a circuit connecting one of said secondary windings to the input electrodes of said tube to impress thereon potentials characteristic of wave amplitudes above a selected value, a non-linear resistance connected between the input electrodes of said tube, a rectifier having its input terminals coupled to the other of said secondary windings to be energized by wave energy induced therein, and a circuit connecting the output electrodes of said rectifier in series with said non-linear resistance whereby a potential drop which is non-linear relative to the mean amplitude of said wave is produced in said resistance and set up between said input electrodes in the presence of wave amplitudes below said selected value.

8. A device as recited in claim 7 in which an additional resistance is connected in series with the non-linear resistance and in which resistive means is interposed between the input of said rectifier and said second transformer secondary winding.

9. In a modulation meter, a thermionic tube having input and output electrodes, an alternating current circuit connected with said input electrodes for supplying thereto the wave to be metered, a transformer having a primary winding connected in series with an indicator between the output electrodes of said tube, said transformer also having a secondary winding, and means connected with said secondary winding and with the input electrodes of said tube for producing direct current potentials between said electrodes of a value such that said tube is operated to produce indications of the mean value of the applied wave up to a predetermined wave amplitude and then to produce peak indications of said wave for amplitudes above said predetermined value.

10. A meter as recited in claim 9 in which said means comprises a rectifier having its input electrodes coupled to said secondary windings and its output electrodes coupled by way of a resistance between the input electrodes of said tube.

11. An arrangement as recited in claim 4 in which said alternating current circuits includes a condenser, and in which said biasing potential producing means includes resistances, the value of said condenser and resistances being such that said biasing circuit has a response range between fifty and one hundred milli-seconds.

12. In a device for analyzing the character of oscillating voltages, means for producing direct current potentials characteristic of said voltages when they are less than a predetermined amplitude value, means for producing potentials characteristic of said voltages when their amplitude is above said selected value and common means controlled by said first produced potentials for producing indications of the mean value of said voltages below said selected amplitude value and controlled by said second produced potentials to produce indications of the peak values of said voltages above said selected value.

13. In a device for analyzing the character of oscillating voltages, means for producing direct current potentials characteristic of said voltages when they are below a predetermined amplitude value, means for producing potentials characteristic of said voltages when their amplitude is above said selected value and common means energized by said first produced potentials for producing indications of the mean amplitude of said voltages below said selected amplitude value and energized by said first and second produced potentials to produce indications of the peak values of said voltages above said selected value.

14. In a peak reading and mean amplitude value reading meter, an electron discharge tube having a plurality of electrodes including an anode and a cathode and a control grid electrode, an indicator connected with the anode and cathode of said tube, means for applying oscillating voltages to the control grid and cathode of said tube, means for producing a direct current potential on the control grid of said tube substantially characteristic of the logarithm of the mean value of the applied voltages below a selected value to produce readings in said meter characteristic of said average of the mean value of said voltages, and impedance means for producing additional potentials on said control grid when said voltages exceed a predetermined value to produce readings in said meter characteristic of the peak values of said voltages when they are above said selected value.

15. In a peak reading and mean value reading meter to be used to analyze modulating potentials of varying amplitude, an electron discharge tube having a control grid and a cathode and an output electrode, an indicator connected to said output electrode, means for applying said modulating potentials to the control grid and cathode of said tube, means energized by said applied potentials for biasing the control grid of said tube to such a value that peaks only of said modulating potentials produce changes in indications of said meter, and means for reducing the bias on said control grid when said potentials fall below a selected value to produce changes in indications of said meter which are characteristic of the mean amplitude of said potentials.

16. In a peak reading and mean value reading meter to be used with a source of modulating potentials, an electron discharge tube having a control grid and a cathode and an output electrode, a meter connected with said output electrode, means for applying said modulating potentials to the control grid and cathode of said tube, means including a biasing resistance and a rectifier connected therewith and energized by said potentials for biasing the control grid of said tube to such a value that peaks only of said modulating potentials produce changes in indications of said meter, the values of said biasing resistance and the value of said potentials being such that when said modulating potentials fall below a selected value said tube is biased to produce changes in indications of said tube which are characteristic of the mean amplitude of said potentials.

17. In an apparatus for producing peak readings and mean value readings characteristic of peak and mean values respectively of modulating potentials, an electron discharge tube having a control grid, a cathode, and an anode, a peak reading and mean value reading meter connected with the anode and cathode of said tube, an alternating current circuit connected with the control grid of said tube for applying modulating potentials thereto, non-linear biasing means connected with the control grid of said tube and energized by said potentials for biasing said grid to such a value that indications characteristic of the mean amplitude of said modulating potentials are produced at said meter when said potentials are less than a selected value, and means for supplying an additional biasing potential to said control grid characteristic of the peak values of said potentials above said selected value for producing peak potential readings at said meter.

18. In a device for producing mean indications of alternating voltages as long as the same remain below a predetermined value and for producing peak readings when said voltages exceed said predetermined value, a substantially linear rectifier having input electrodes energized by voltages proportional to said alternating voltage, said rectifier having output electrodes, a resistor whose resistance decreases with increasing current so that the ratio of the direct current drop across said resistor to the direct current potential impressed on said resistor decreases as the said potential increases connected with the output of said rectifier, a uni-lateral conductor device, a circuit including a condenser in series with said uni-lateral conductor device, means for impressing alternating voltages proportional to said first named alternating voltages on said series circuit, a direct current path including a high resistance and said resistor connected in series with said uni-lateral conductor device, and an indicator connected with said uni-lateral device to be energized in proportion to the average or direct current potentials impressed on said uni-lateral device.

JUSTUS BÄBLER.